(12) United States Patent
Ogawa

(10) Patent No.: US 9,393,974 B2
(45) Date of Patent: Jul. 19, 2016

(54) RAILWAY VEHICLE VIBRATION DAMPING DEVICE

(71) Applicant: KAYABA INDUSTRY CO., LTD., Tokyo (JP)

(72) Inventor: Takayuki Ogawa, Sagamihara (JP)

(73) Assignee: KYB Corporation, Tokyo (JP)

( * ) Notice: Subject to any disclaimer, the term of this patent is extended or adjusted under 35 U.S.C. 154(b) by 122 days.

(21) Appl. No.: 14/352,317

(22) PCT Filed: Mar. 13, 2013

(86) PCT No.: PCT/JP2013/056945
§ 371 (c)(1),
(2) Date: Apr. 16, 2014

(87) PCT Pub. No.: WO2013/137295
PCT Pub. Date: Sep. 19, 2013

(65) Prior Publication Data
US 2014/0249705 A1    Sep. 4, 2014

(30) Foreign Application Priority Data

Mar. 14, 2012    (JP) .................................. 2012-056848

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| B61F 5/12 | (2006.01) |
| B61F 5/24 | (2006.01) |
| F16F 9/10 | (2006.01) |

(52) U.S. Cl.
CPC . *B61F 5/12* (2013.01); *B61F 5/245* (2013.01); *F16F 9/10* (2013.01)

(58) Field of Classification Search
CPC ............... B61F 5/245; B61F 5/12; F16F 9/10
USPC ............................................................ 701/19
See application file for complete search history.

(56) References Cited

U.S. PATENT DOCUMENTS

| | | | | |
|---|---|---|---|---|
| 5,454,329 A | * | 10/1995 | Liprandi ................... | B61F 5/06 105/171 |
| 2011/0285842 A1 | * | 11/2011 | Davenport .............. | B61L 23/04 348/116 |
| 2013/0032054 A1 | * | 2/2013 | Schneider ................. | B61F 5/22 105/199.1 |

FOREIGN PATENT DOCUMENTS

| | | |
|---|---|---|
| JP | 06-278606 A | 10/1994 |
| JP | 09-193794 A | 7/1997 |

(Continued)

*Primary Examiner* — Calvin Cheung
*Assistant Examiner* — Paula L Schneider
(74) *Attorney, Agent, or Firm* — Rabin & Berdo, P.C.

(57) ABSTRACT

Two or more front-side vibration suppression force generation sources and two or more rear-side vibration suppression force generation sources are interposed between bogies and the vehicle body. A controller calculates a sway high-frequency vibration suppression force for suppressing vibration having a frequency which is not less than a frequency of a centrifugal acceleration acting on the vehicle body when the railway vehicle runs in a curve section. The controller lets at least a part of the front-side vibration suppression force generation sources and at least a part of the rear-side vibration suppression force generation sources output a resultant force of a yaw suppression force and the sway high-frequency vibration suppression force. The controller lets all the remaining vibration suppression force generation sources function as passive dampers when the railway vehicle runs in the curve section. Ride quality of the vehicle in the curve section is thereby improved.

9 Claims, 7 Drawing Sheets

(56) References Cited

FOREIGN PATENT DOCUMENTS

| JP | 2003-320931 A | 11/2003 |
| JP | 2008-247204 A | 10/2008 |
| JP | 2008-247333 A | 10/2008 |
| JP | 2011-184017 A | 9/2011 |
| JP | 2011-184018 A | 9/2011 |
| JP | 2011-184019 A | 9/2011 |
| JP | 2011-201333 A | 10/2011 |

* cited by examiner

RAILWAY VEHICLE VIBRATION DAMPING DEVICE

TECHNICAL FIELD

This invention relates to vibration suppression during curve running for a railway vehicle.

BACKGROUND ART

A railway vehicle vibration damping device for suppressing vibration of a vehicle body in the right and left direction with respect to the running direction of the railway vehicle comprises for example a variable damping force damper interposed between the vehicle body and a bogie. A damping force required for suppressing the vehicle body vibration is determined from an angular speed in the yaw direction of the vehicle body in vehicle body center and a speed in the sway direction of the vehicle body, and a damping force of the variable damping force damper is adjusted to exert the determined damping force.

More specifically, a damping force required for vibration suppression in the yaw direction is calculated by multiplying a yaw rate by a distance from the vehicle body center to a bogie center and a control gain. A damping force required for suppressing vibration in the sway direction is calculated by multiplying the speed in the sway direction by the control gain. The damping force to be generated by the variable damping force damper is calculated by adding the damping force for the vibration suppression in the yaw direction and the damping force for vibration suppression in the sway direction.

JP 2003-320931A published by the Japan Patent Office proposes that variable damping force dampers for suppressing vibration in the yaw direction and in the sway direction are respectively provided between a vehicle body of a railway vehicle and a front bogie for supporting a vehicle body front part and between the vehicle body and a rear bogie for supporting a vehicle body rear part.

SUMMARY OF INVENTION

A resonance frequency band of a vehicle body of a railway vehicle ranges from 0.5 hertz (Hz) to 2 Hz. Although a centrifugal acceleration acts on the vehicle body when the railway vehicle runs in a curve section, a frequency of this centrifugal acceleration is highly close to a resonance frequency of the vehicle body.

In order to obtain a yaw rate of the vehicle body and a speed in the sway direction, in general, acceleration sensors provided in front and rear parts of the vehicle body are used. The yaw rate is determined based on a difference between accelerations obtained by the acceleration sensors. The speed in the sway direction is determined based on a value determined by adding the two accelerations, which are obtained by the acceleration sensors.

Since the difference between the accelerations is taken regarding the yaw rate, an influence of the centrifugal acceleration acting on the vehicle body when the railway vehicle runs in the curve section is removed. Meanwhile, since the speed in the sway direction is determined by adding the accelerations, the centrifugal acceleration is superimposed on the acceleration of the vibration, and the centrifugal acceleration cannot be removed.

Due to increasing speed of the railway vehicle, the centrifugal acceleration cannot be ignored. Therefore, when the damping force is determined while the centrifugal acceleration is superimposed on the speed in the sway direction, the damping force is increased more than necessary, so that ride quality in a vehicle is adversely affected.

When the speed of the vehicle in the sway direction is filtered by a band-pass filter or a high-pass filter to extract only vibration of the resonance frequency band of the vehicle body, since the frequency of the centrifugal acceleration is close to the resonance frequency as described above, the centrifugal acceleration is not easily removed. Meanwhile, by decreasing a gain in the resonance frequency band of the vehicle body in the curve section, the influence of the centrifugal acceleration may be cancelled out. In this case, however, the damping force for suppressing the vibration of the resonance frequency band of the vehicle body becomes short, so that the ride quality of the vehicle is also deteriorated.

It is therefore an object of this invention to improve ride quality of a railway vehicle in a curve section.

In order to achieve the above object, a railway vehicle vibration damping device according to this invention comprises two or more front-side vibration suppression force generation sources interposed between a front bogie of the railway vehicle and a vehicle body, two or more rear-side vibration suppression force generation sources interposed between a rear bogie of the railway vehicle and the vehicle body, and a programmable controller programmed to calculate a yaw suppression force for suppressing vibration in a yaw direction of the vehicle body, calculate a sway suppression force for suppressing vibration in a sway direction of the vehicle body, and control the front-side vibration suppression force generation sources and the rear-side vibration suppression force generation sources based on the yaw suppression force and the sway suppression force.

The controller is further programmed to calculate a sway high-frequency vibration suppression force for suppressing vibration having a frequency which is not less than a frequency of a centrifugal acceleration acting on the vehicle body, and let at least a part of the front-side vibration suppression force generation sources and at least a part of the rear-side vibration suppression force generation sources output a resultant force of the yaw suppression force and the sway high-frequency vibration suppression force and let all the remaining front-side vibration suppression force generation sources and all the remaining rear-side vibration suppression force generation sources function as passive dampers, when the railway vehicle runs in the curve section.

The details as well as other features and advantages of this invention are set forth in the remainder of the specification and are shown in the accompanying drawings.

DESCRIPTION OF EMBODIMENTS

Figure 1:
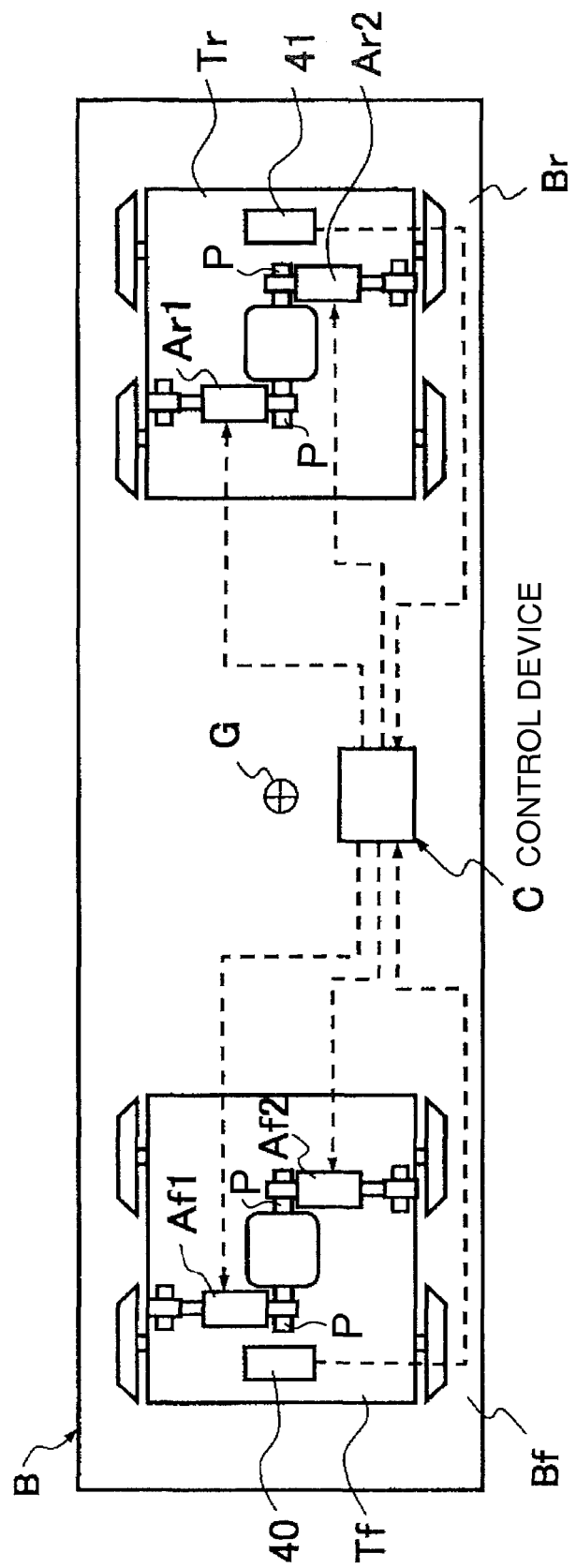
FIG. 1 is a schematic plan view of a railway vehicle in which a railway vehicle vibration damping device according to an embodiment of this invention is mounted.

Referring to FIG. 1 of the drawings, a railway vehicle vibration damping device 1 according to an embodiment of this invention is used as vibration damping device for a vehicle body B of a railway vehicle.

The railway vehicle vibration damping device 1 comprises hydraulic actuators Af1, Af2 interposed between a front bogie Tf and the vehicle body B, hydraulic actuators Ar1, Ar2 interposed between a rear bogie Tr and the vehicle body B, and a control device C for controlling the actuators Af1, Af2, Ar1, Ar2. In detail, one ends of the actuators Af1 and Af2 are respectively coupled to a pin P protruding in the front and aft direction from a front part Bf of the vehicle body B, and the other ends are coupled to the front bogie Tf. One ends of the actuators Ar1 and Ar2 are coupled to another pin P protruding in the front and aft direction from a rear part Br of the vehicle body B, and the other ends are coupled to the rear bogie Tr.

The control device C suppresses horizontal vibration in the vehicle transverse direction of the vehicle body B by performing active control of the actuators Af1, Af2, Ar1, Ar2, or in other words, by letting the actuators Af1, Af2, Ar1, Ar2 function as active dampers.

The control device C detects a horizontal acceleration $\alpha f$ in the vehicle transverse direction of the vehicle body front part Bf of the vehicle body B and a horizontal acceleration $\alpha r$ in the vehicle transverse direction of the vehicle body rear part Br of the vehicle body B, and calculates a yaw acceleration $\omega$ serving as an angular acceleration about a vehicle body center G immediately above the front and rear bogies Tf, Tr based on the horizontal accelerations $\alpha f$ and $\alpha r$. The control device C also calculates a sway acceleration S serving as an acceleration in the horizontal transverse direction of the center G of the vehicle body B based on the horizontal acceleration $\alpha f$ and the horizontal acceleration $\alpha r$. The control device C further calculates a target yaw suppression force $F\omega ref$ required for yaw vibration suppression of the entire vehicle body based on the yaw acceleration $\omega$. The control device C further calculates a target sway low-frequency vibration suppression force FSLref required for suppression of sway low-frequency vibration of the entire vehicle body and a target sway high-frequency vibration suppression force FSHref required for suppression of sway high-frequency vibration of the entire vehicle body based on the sway acceleration S.

The control device C determines whether a section in which the railway vehicle runs corresponds to a curve section or a non-curve section.

During running in the non-curve section, the control device C lets the front side actuator Af1 and the rear side actuator Ar1 exert a resultant force of a yaw suppression force $F\omega$ obtained by multiplying the target yaw suppression force $F\omega ref$ by one half and a sway high-frequency vibration suppression force FSH obtained by multiplying the target sway high-frequency vibration suppression force FSHref by one half. The control device C also lets the front side actuator Af2 and the rear side actuator Ar2 exert a sway low-frequency vibration suppression force FSL obtained by multiplying the target sway low-frequency vibration suppression force FSLref by one half.

During running in the curve section, the control device C lets the front side actuator Af1 and the rear side actuator Ar1 respectively exert the resultant force of the yaw suppression force $F\omega$ and the sway high-frequency vibration suppression force FSH. The control device C also lets the front side actuator Af2 and the rear side actuator Ar2 respectively function as passive dampers.

Specific configurations of the front side actuators Af1 and Af2 and the rear side actuators Ar1 and Ar2 will be described below. Since all the actuators Af1, Af2, Ar1, and Ar2 have the same configurations, in order to avoid redundant description, only the configuration of the actuator Af1 will be described and description of the other actuators Af2, Ar1, and Ar2 will be omitted.

Figure 2:
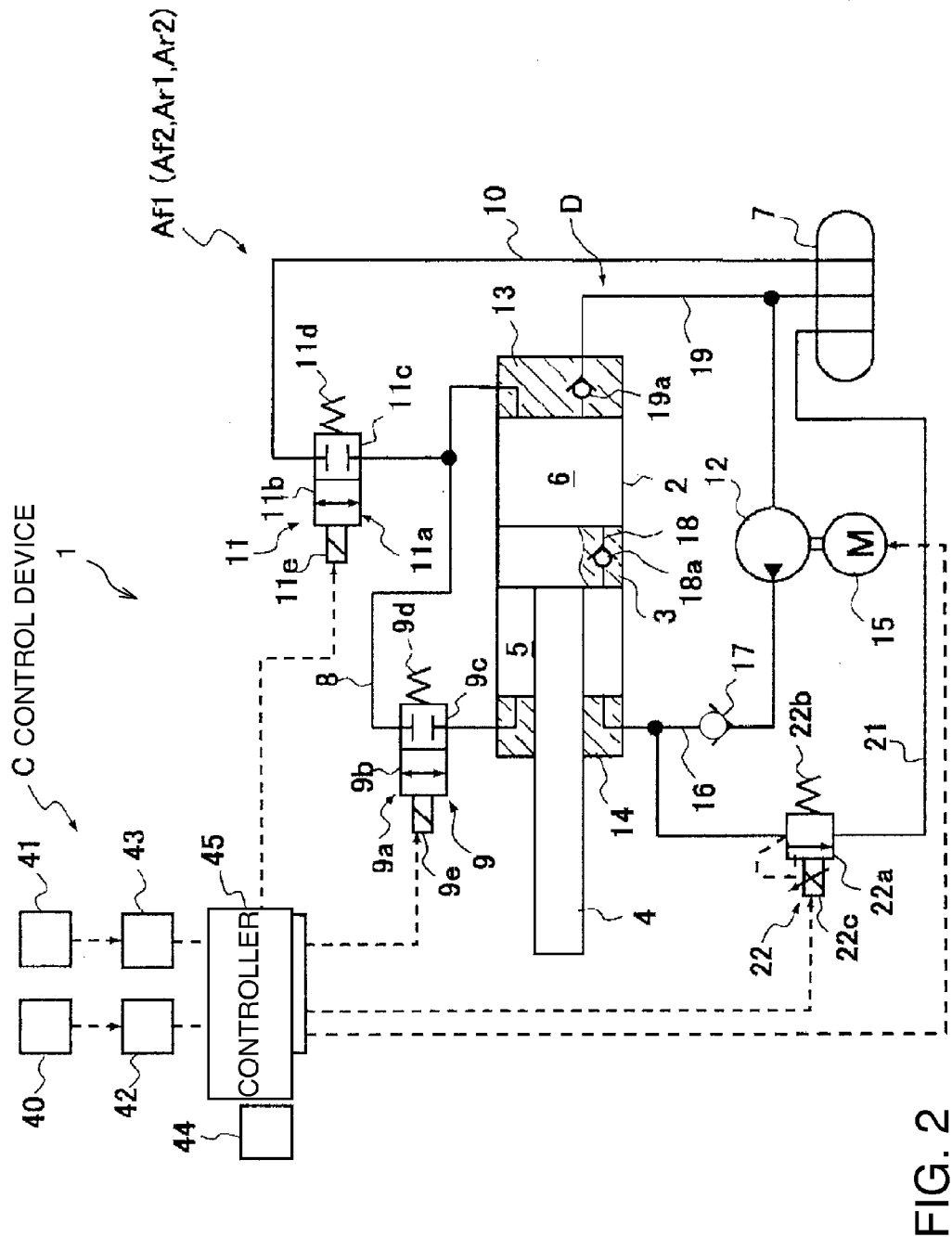
FIG. 2 is a hydraulic circuit diagram of an actuator provided in the railway vehicle vibration damping device.

Referring to FIG. 2, the actuator Af1 is formed by a single rod type actuator. The actuator Af1 comprises a cylinder 2 coupled to one the front bogie Tf and the vehicle body B of the railway vehicle, a piston 3 housed in the cylinder 2 so as to be free to slide, and a rod 4 of which one end is joined to the piston 3 and another end is coupled to another of the front bogie Tf and the vehicle body B.

An interior of the cylinder 2 is partitioned into a rod side chamber 5 and a piston side chamber 6 by the piston 3. The rod side chamber 5 and the piston side chamber 6 are filled with working oil. A tank 7 of the working oil is provided on the outer side of the actuator Af1. In addition to the working oil, a gas is charged in the tank 7. It should be noted, however, that there is no need for bringing the tank 7 into a pressurized state by charging the gas in a compressed state.

The rod side chamber 5 and the piston side chamber 6 are connected by a first passage 8. A first shut-off valve 9 is provided in the first passage 8. The piston side chamber 6 and the tank 7 are connected by a second passage 10. A second shut-off valve 11 is provided in the second passage 10. The working oil is supplied to the rod side chamber 5 from a pump 12. It should be noted that although the first passage 8 provides communication between the rod side chamber 5 and the piston side chamber 6 outside the cylinder 2, the first passage 8 can be provided in the piston 3.

The actuator Af1 performs an expansion operation by opening the first shut-off valve 9 and bringing the first passage 8 into a communication state, closing the second shut-off valve 11 to bring the second passage 10 into a block state, and operating the pump 12. Meanwhile, the actuator Af1 performs a contraction operation by opening the second shut-off valve 11 to bring the second passage 10 into the communication state, closing the first shut-off valve 9 to bring the first passage 8 into the block state, and operating the pump 12.

Parts of the actuator Af1 will be described in detail. The cylinder 2 is formed in a tubular shape, an end part on the right side in the figure is closed by a lid 13, and an end part on the left side in the figure is fixed to an annular rod guide 14. The rod guide 14 supports the rod 4 inserted into the cylinder 2 so as to be free to slide. One end of the rod 4 protrudes outward in an axial direction from the cylinder 2, and another end of the rod 4 is coupled to the piston 3 in the cylinder 2.

A part between an outer circumference of the rod 4 and the cylinder 2 is sealed by a seal member, so that the interior of the cylinder 2 is maintained in a tightly sealed state. As described above, the working oil fills the rod side chamber 5 and the piston side chamber 6 partitioned by the piston 3 in the cylinder 2. Any liquid other than the working oil may be used as long as it is suitable for the actuator.

In the actuator Af1, a sectional area of the rod 4 is set to be one second of a sectional area of the piston 3. A pressure receiving area on the side of the rod side chamber 5 of the piston 3 is one second of a pressure receiving area on the side of the piston side chamber 6. When a pressure of the rod side chamber 5 is equalized during an expansion operation and the a contraction operation of the actuator Af1, an identical thrust is generated in expansion and contraction directions. A supply amount of the working oil with respect to a displacement amount of the actuator Af1 is also equalized regarding both the expansion and contraction directions.

In a case where the actuator Af1 performs the expansion operation, the rod side chamber 5 and the piston side chamber 6 are brought into the communication state. As a result, pressures of the rod side chamber 5 and the piston side chamber 6 are equalized, and an expansion thrust force obtained by multiplying the difference between the pressure receiving area of the rod side chamber 5 and the pressure receiving area on the side of the piston side chamber 6 of the piston 3 by the pressure is generated. On the other hand, in a case where the actuator Af1 performs the contraction operation, the communication between the rod side chamber 5 and the piston side chamber 6 is blocked, and the piston side chamber 6 is opened to the tank 7. As a result, a contraction side thrust force obtained by multiplying the pressure of the rod side chamber 5 and the pressure receiving area of the rod side chamber 5 of the piston 3 is generated. In such a way, the generated thrust force of the actuator Af1 is a value obtained by multiplying one second of the sectional area of the piston 3 by the pressure of the rod side chamber 5 in both the expansion and the contraction.

Therefore, in a case where the control device C controls the thrust force of the actuator Af1, even in any of the expansion operation and the contraction operation, only the pressure of the rod side chamber 5 may be controlled. In such a way, when the pressure receiving area on the side of the rod side chamber 5 of the piston 3 is set to be one second of the pressure receiving area on the side of the piston side chamber 6, the pressure of the rod side chamber 5 for generating an equal thrust force in both the expansion and contraction directions is equal in both the expansion and contraction directions, and therefore the control is easy. Further, the supply amount of the working oil with respect to the displacement amount of the piston 3 is also equalized irrespective of the direction of displacement. Therefore, equal response regarding the operations in both the expansion and contraction directions can be obtained. Even in a case where the pressure receiving area in the rod side chamber 5 of the piston 3 is not set to be one second of the pressure receiving area in the piston side chamber 6, the thrust of the actuator Af1 on both the expansion and contraction sides is controlled using the pressure in the rod side chamber 5.

A front end of the rod 4 and the lid 13 for closing a base end of the cylinder 2 comprise attachment parts, not shown in the figures. The actuator Af1 is interposed between the vehicle body B of the railway vehicle and the front bogie Tf via the attachment parts.

The first shut-off valve 9 is constituted by an electromagnetic shut-off valve. The first shut-off valve 9 comprises a valve body 9a, a spring 9d, and a solenoid 9e. The valve body 9a comprises a communication position 9b for opening the first passage 8 and providing connection between the rod side chamber 5 and the piston side chamber 6, and a block position 9c for blocking the communication between the rod side chamber 5 and the piston side chamber 6. The spring 9d biases the valve body 9a toward the block position 9c. The solenoid 9e biases the valve body 9a to the communication position 9b against the spring 9d by excitation.

The second shut-off valve 11 is constituted by an electromagnetic shut-off valve. The second shut-off valve 11 comprises a valve body 11a, a spring 11d, and a solenoid 11e. The valve body 11a comprises a communication position 11b for providing connection between the piston side chamber 6 and the tank 7 via the second passage 10, and a block position 11c for blocking the communication between the piston side chamber 6 and the tank 7. The spring 11d biases the valve body 11a toward the block position 11c. The solenoid 11e drives the valve body 11a to the communication position 11b against the spring 11d by excitation.

The pump 12 is driven and rotated by an electric motor 15. The pump 12 discharges the working oil only in one direction. A discharge port of the pump 12 communicates with the rod side chamber 5 via a supply passage 16. A suction port of the pump 12 communicates with the tank 7. The pump 12 driven by the electric motor 15 suctions the working oil from the tank 7, and supplies the pressurized working oil to the rod side chamber 5.

Since the pump 12 discharges the working oil only in one direction, it does not require a switching operation of the rotation direction. Therefore, there is never a problem that a discharge amount is changed at the time of rotation switching, and an inexpensive gear pump or the like can be used as the pump 12. Since the rotation direction of the pump 12 is always the same, the electric motor 15 for driving the pump 12 is not required to have response regarding rotation switching, and an inexpensive motor can also be used as the electric motor 15. In the supply passage 16, a check valve 17 for inhibiting a counter flow of the working oil from the rod side chamber 5 to the pump 12 is provided.

When a predetermined flow rate of the working oil is supplied from the pump 12 to the rod side chamber 5 and the actuator Af1 performs the expansion operation, the first shut-off valve 9 is opened while the pressure of the rod side chamber 5 is adjusted by on-off control of the second shut-off valve 11. When the actuator Af1 performs the contraction operation, the second shut-off valve 11 is opened while the pressure in the rod side chamber 5 is adjusted by on-off control of the first shut-off valve 9. In such a way, the thrust force corresponding to the suppression force calculated by the control device C is obtained.

When the actuator Af1 performs the expansion operation, the rod side chamber 5 and the piston side chamber 6 communicate with each other, and the pressure in the piston side chamber 6 is equalized to the pressure of the rod side chamber 5. As a result, by controlling the pressure of the rod side chamber 5 both at the time of the expansion operation and at the time of the contraction operation, the thrust force can be controlled. The first shut-off valve 9 and the second shut-off valve 11 can also be constituted by a variable relief valve having an on-off function with an adjusting function of a relief pressure. In this case, the actuator Af1 is not expanded and contracted by an on-off operation of the first shut-off valve 9 or the second shut-off valve 11 but the thrust force of the actuator Af1 is controlled by adjusting a valve opening pressure of the first shut-off valve 9 or the second shut-off valve 11.

In the railway vehicle vibration damping device 1, in order to more easily adjust the thrust force of the actuator Af1, the rod side chamber 5 and the tank 7 are connected by a discharge passage 21, and a variable relief valve 22 capable of changing a relief pressure is provided in the discharge passage 21.

The variable relief valve 22 is constituted by an electromagnetic proportional relief valve. The variable relief valve 22 comprises a valve body 22a provided in the discharge passage 21, a spring 22b for biasing the valve body 22a in a direction of blocking the discharge passage 21, and a proportional solenoid 22c for exerting a thrust force to the valve body 22a against the spring 22b in accordance with excitation. The control device C controls the relief pressure by controlling a current amount flowing through the proportional solenoid 22c.

In the variable relief valve 22, when the pressure of the rod side chamber 5 exceeds the relief pressure, a resultant force of the pressure of the rod side chamber 5 and the thrust force by the proportional solenoid 22c, which is exerted on the valve body 22a, overcomes a bias force of the spring 22b. The valve body 22a is then driven to an open position to cause the discharge passage 21 to communicate.

In the variable relief valve 22, when the current amount to be supplied to the proportional solenoid 22c is increased, the thrust force generated by the proportional solenoid 22c increases. That is, when the current amount supplied to the proportional solenoid 22c is maximized, the relief pressure of the variable relief valve 22 becomes minimum. When no electric current is supplied to the proportional solenoid 22c, the relief pressure becomes maximum.

By providing the discharge passage 21 and the variable relief valve 22, at the time of the expansion operation of the actuator Af1, the pressure in the rod side chamber 5 is adjusted to the relief pressure of the variable relief valve 22. In such a way, by setting of the relief pressure of the variable relief valve 22, the pressure of the rod side chamber 5 can be readily adjusted. By providing the discharge passage 21 and the variable relief valve 22, sensors and the like applied for adjusting the thrust force of the actuator Af1 are not required. Also, there is no need for opening/closing the first shut-off valve 9 and the second shut-off valve 11 at high speed or forming the first shut-off valve 9 and the second shut-off valve 11 by a variable relief valve having an on-off function. As a result, manufacturing cost of the railway vehicle vibration damping device 1 can be reduced, and a secure vibration suppression system in terms of both hardware and software can be constructed.

By forming the variable relief valve 22 by an electromagnetic proportional relief valve capable of performing proportional control of the relief pressure in accordance with a given current amount, the relief pressure can be readily controlled. As long as the relief pressure is adjustable, a valve body other than the electromagnetic proportional relief valve can be used as the variable relief valve 22.

When the pressure of the rod side chamber 5 exceeds the relief pressure, irrespective of an on-off state of the first shut-off valve 9 and the second shut-off valve 11, the variable relief valve 22 opens the discharge passage 21 and lets the rod side chamber 5 communicate with the tank 7. An excessive pressure in the rod side chamber 5 is thereby released to the tank 7. Provision of the discharge passage 21 and the variable relief valve 22 helps protect the entire system against for example an excessive input to the actuator Af1.

The actuator Af1 comprises a damper circuit D. The damper circuit D lets the actuator Af1 function as a damper in a state where the first shut-off valve 9 and the second shut-off valve 11 are closed. The damper circuit D comprises a one-way passage 18 for allowing only a flow of the working oil from the piston side chamber 6 toward the rod side chamber 5, and a suction passage 19 for allowing only a flow of the working oil from the tank 7 toward the piston side chamber 6. The variable relief valve 22 provided in the discharge passage 21 herein functions as a damping valve.

In more detail, the one-way passage 18 provided with a check valve 18a allows only the flow of the working oil from the piston side chamber 6 toward the rod side chamber 5. The suction passage 19 provided with a check valve 19a allows only the flow of the working oil from the tank 7 toward the piston side chamber 6. By causing the block position 9c of the first shut-off valve 9 to function as a check valve for allowing only the flow of the working oil from the piston side chamber 6 toward the rod side chamber 5, the one-way passage 18 can be omitted. Also, by causing the block position 11c of the second shut-off valve 11 to function as a check valve for allowing only the flow of the working oil from the tank 7 toward the piston side chamber 6, the suction passage 19 can be omitted.

In a case where the first shut-off valve 9 is at the block position 9c and the second shut-off valve 11 is at the block position 11c, the damper circuit D provided in the actuator Af1 forms a circulation passage going through the piston side chamber 6, the rod side chamber 5, and the tank 7 with the one-way passage 18, the discharge passage 21, and the suction passage 19. All the one-way passage 18, the suction passage 19, and the discharge passage 21 go one way. Therefore, when the actuator Af1 is caused to expand and contract by an external force, the working oil from the cylinder 2 is always discharged to the tank 7 via the discharge passage 21.

Meanwhile, a shortage of the working oil in the cylinder 2 is supplied from the tank 7 into the cylinder 2 via the suction passage 19. Since the variable relief valve 22 acts as a resistance against the flow of the working oil described above, the pressure of the cylinder 2 is adjusted to be the relief pressure. That is, the variable relief valve 22 functions as a pressure control valve, and the actuator Af1 functions as a uniflow type passive damper.

As described above, the actuator Af1 is formed to function both as an actuator and a passive damper. It should be noted that the damper circuit D may be formed by separately providing a passage providing connection between the rod side chamber 5 and the tank 7 and providing a damping valve in this passage without providing the variable relief valve 22 and the discharge passage 21.

In a failure state that power cannot be distributed to components of the actuator Af1, the valve body 9a of the first shut-off valve 9 is pressed by the spring 9d and retained at the block position 9c, and the valve body 11a of the second shut-off valve 11 is pressed by the spring 11d and retained at the block position 11c. Meanwhile, the variable relief valve 22 functions as a pressure control valve in which the relief pressure is fixed to be maximum. Therefore, the actuator Af1 functions as a passive damper. In a case where the actuator Af1 functions as a passive damper, the variable relief valve 22 functions as a damping valve. By setting the relief pressure of the variable relief valve 22 in a case where the current amount is zero, damping characteristics when the actuator Af1 functions as a passive damper can be set arbitrarily.

In a case where the actuators Af1, Af2, Ar1, Ar2 formed as above exert the thrust force in the expansion direction, the control device C, while rotating the electric motor 15 and supplying the working oil from the pump 12 into the cylinder 2, brings the first shut-off valve 9 to the communication position 9b and the second shut-off valve 11 to the block position 11c for each of the actuators Af1, Af2, Ar1, Ar2. By this operation, in a state that the rod side chamber 5 and the piston side chamber 6 of each of the actuators Af1, Af2, Ar1, Ar2 communicate with each other, the working oil is supplied to the actuators Af1, Af2, Ar1, Ar2 from the pump 12, and by pushing the piston 3 to the left side of FIG. 2, the actuators Af1, Af2, Ar1, Ar2 exert the thrust force in the expansion direction.

When the pressures of the rod side chamber 5 and the piston side chamber 6 exceed the relief pressure of the variable relief valve 22, the variable relief valve 22 is opened and the working oil flows out to the tank 7 via the discharge passage 21. The pressures in the rod side chamber 5 and in the piston side chamber 6 are thereby maintained to be the relief pressure of the variable relief valve 22 determined by the current amount supplied to the variable relief valve 22. The thrust force exerted by each of the actuators Af1, Af2, Ar1, Ar2 is equal to a value obtained by multiplying the pressure receiving area difference of the piston 3 between the piston side chamber 6 and the rod side chamber 5 by the pressure of the rod side chamber 5.

Meanwhile, in a case where each of the actuators Af1, Af2, Ar1, Ar2 exerts the thrust force in the contraction direction, the control device C, while rotating the electric motor 15 and supplying the working oil from the pump 12 into the rod side chamber 5, brings the first shut-off valve 9 to the block position 9c and the second shut-off valve 11 to the communication position 11b for each of the actuators Af1, Af2, Ar1, Ar2. By doing so, the working oil is supplied from the pump 12 to the rod side chamber 5 in a state that the piston side chamber 6 and the tank 7 communicate with each other. Thus, the piston 3 is pushed in the right direction of FIG. 2, and each of the actuators Af1, Af2, Ar1, Ar2 exerts the thrust force in the contraction direction. The thrust force exerted by each of the actuators Af1, Af2, Ar1, Ar2 is equal to a value obtained by multiplying the piston pressure receiving area on the side of the rod side chamber 5 by the pressure in the rod side chamber 5.

The actuators Af1, Af2, Ar1, Ar2 not only function as actuators or active dampers, but also function as passive dampers only by the on-off operation of the first shut-off valve 9 and the second shut-off valve 11 irrespective of an operation state of the electric motor 15. Readiness of switching between actuators and passive dampers is preferable for enhancing response and reliability of the railway vehicle vibration damping device 1.

Since the actuators Af1, Af2, Ar1, Ar2 are a single rod type, stroke length is easily ensured in comparison to double rod type actuators, so that the entire length of the actuators can be suppressed to be short. Mounting the actuators Af1, Af2, Ar1, Ar2 onto the railway vehicle is thereby rendered easy.

In the actuators Af1, Af2, Ar1, Ar2, the working oil flowing from the pump 12 into the rod side chamber 5 finally returns to the tank 7 via the piston side chamber 6. Therefore, even when the gas is mixed into the rod side chamber 5 or the piston side chamber 6, the gas is discharged to the tank 7 through the expansion and contraction operations of each of the actuators Af1, Af2, Ar1, Ar2. This provides a preferable effect for preventing deterioration of response regarding generation of the thrust force. There is also no need for frequently performing maintenance for maintaining performances of the actuators Af1, Af2, Ar1, Ar2, so that labor and cost burdens in terms of maintenance can be reduced.

Upon manufacturing the actuators Af1, Af2, Ar1, Ar2, there is no need for assembling them in oil or assembling them under a vacuum environment, and advanced deaeration of the working oil is also not required. Therefore, the actuators Af1, Af2, Ar1, Ar2 can be manufactured with high productivity and manufacturing cost can be suppressed to be low.

The control device C comprises a front-side acceleration sensor 40 for detecting a horizontal acceleration $\alpha f$ in the vehicle transverse direction of the vehicle body front part Bf, a rear-side acceleration sensor 41 for detecting a horizontal acceleration $\alpha r$ in the vehicle transverse direction of the vehicle body rear part Br, a band-pass filter 42 for removing noises included in the horizontal acceleration $\alpha f$, a band-pass filter 43 for removing noises included in the horizontal acceleration $\alpha r$, and a spot information acquiring portion 44 for detecting a running position of the railway vehicle.

The control device C comprises a controller 45 for determining whether or not the railway vehicle runs in a curve section based on the running position detected by the spot information acquiring portion 44, and in accordance with a determination result, respectively outputting control commands to the electric motor 15, the solenoid 9e of the first shut-off valve 9, the solenoid 11e of the second shut-off valve 11, and the proportional solenoid 22c of the variable relief valve 22 for each of the actuators Af1, Af2, Ar1, Ar2.

The controller 45 is constituted by a microcomputer comprising a central processing unit (CPU), a read-only memory (ROM), a random access memory (RAM), and an input/output interface (I/O interface). The controller 45 may be constituted by a plurality of microcomputers.

The controller 45 performs H-infinity control to weight the frequency and calculate a target yaw suppression force $F\omega ref$, a target sway low-frequency vibration suppression force FSLref, and a target sway high-frequency vibration suppression force FSHref. With this configuration of the controller 45, the band-pass filters 42, 43 can be omitted.

The spot information acquiring portion 44 is formed by a central vehicle monitor installed in a particular one of coupled cars of the railway vehicle or a vehicle monitor terminal connected thereto, for obtaining running position information of the railway vehicle in real time. The spot information acquiring portion 44 is not limited to the vehicle monitor but can be constituted by a Global Positioning System (GPS) or the like.

Figure 3:
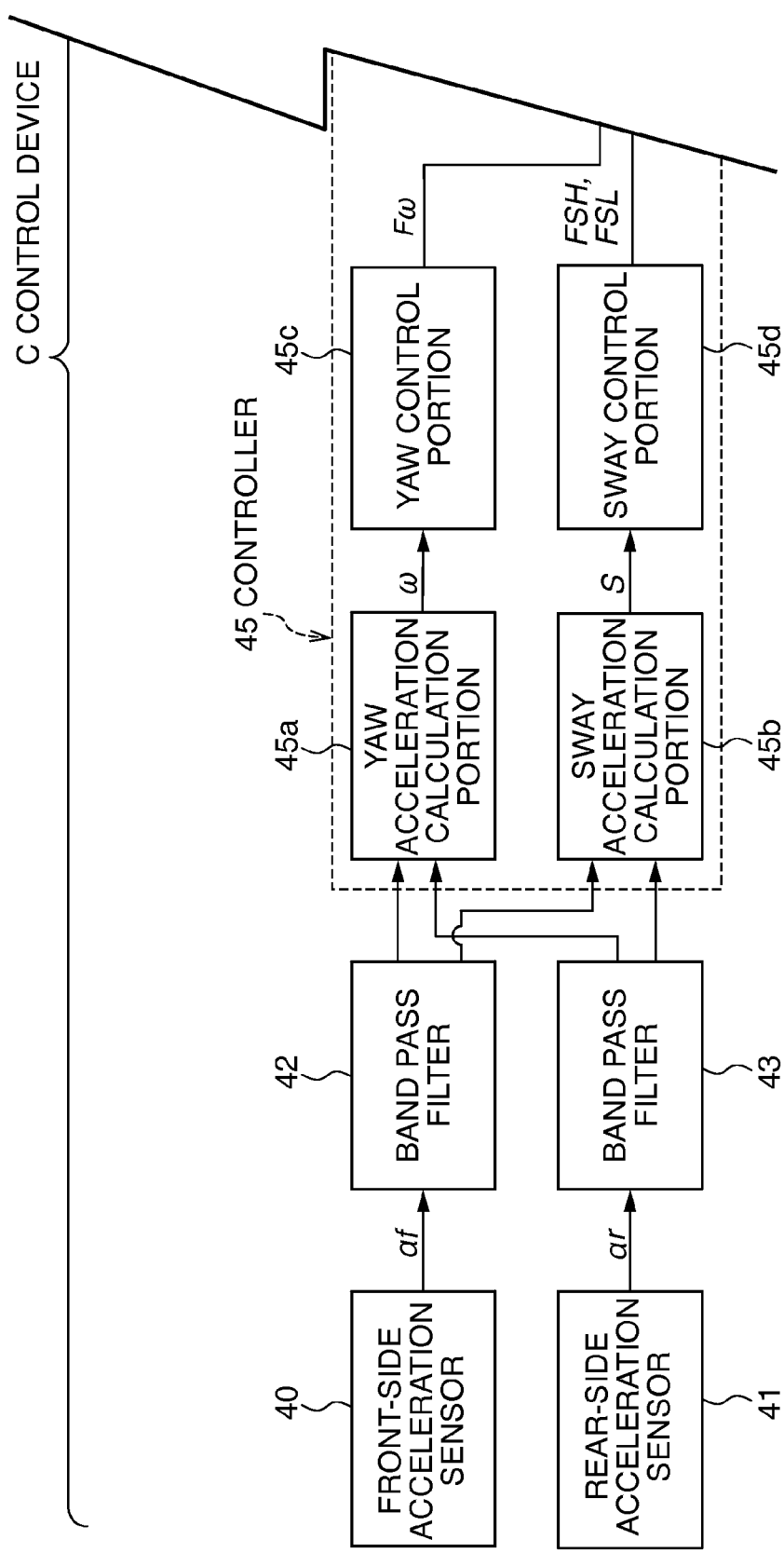
FIG. 3 is a block diagram showing a part of a control function of a control device provided in the railway vehicle vibration damping device.
Figure 4:
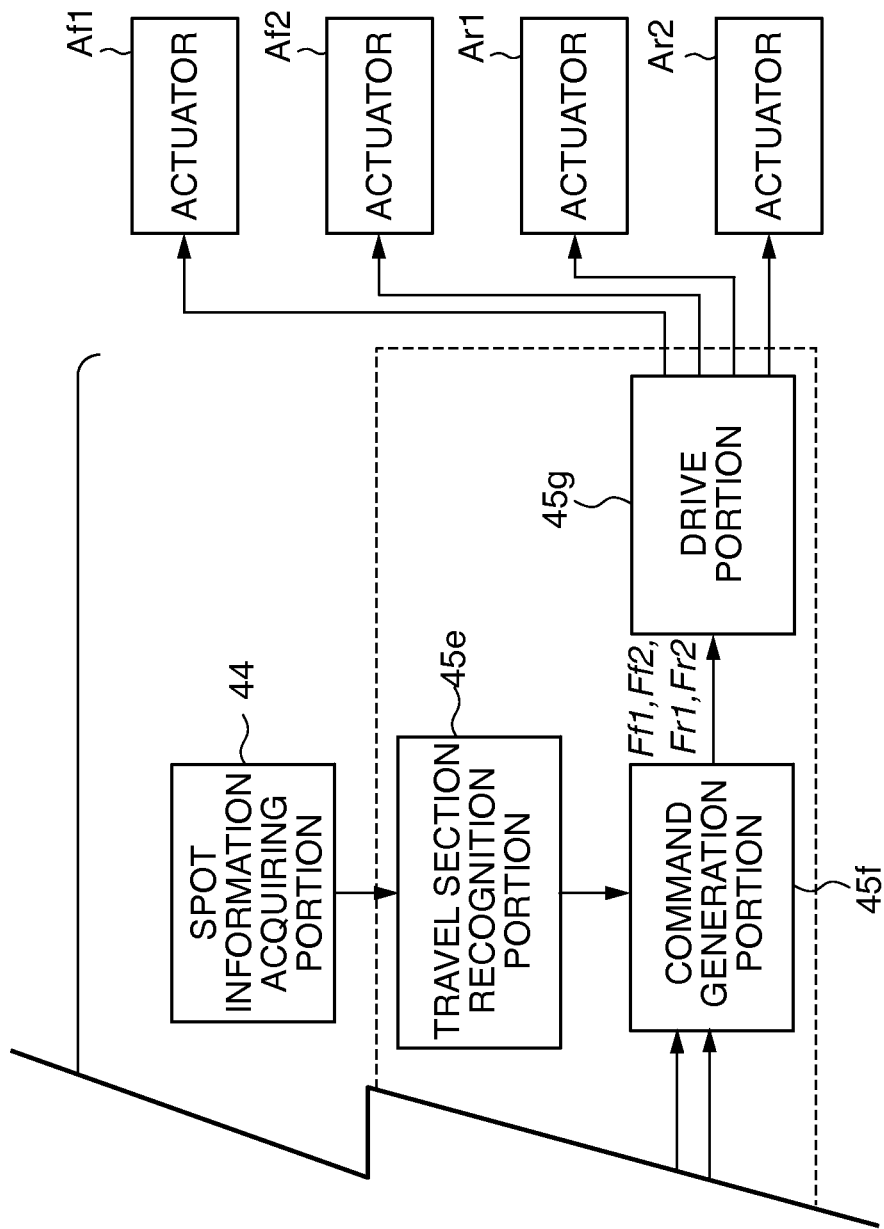
FIG. 4 is a block diagram showing a remaining part of the control function of the control device.

Referring to a diagram shown in FIGS. 3 and 4, the controller 45 comprises a yaw acceleration calculation portion 45a, a sway acceleration calculation portion 45b, a yaw control portion 45c, a sway control portion 45d, a travel section recognition portion 45e, a command generation portion 45f, and a drive portion 45g.

The yaw acceleration calculation portion 45a calculates the yaw acceleration $\omega$ about the vehicle body center G immediately above the front bogie Tf and the rear bogie Tr based on the horizontal acceleration $\alpha f$ the vehicle front part Bf detected by the front-side acceleration sensor 40 and the horizontal acceleration $\alpha r$ of the vehicle rear part Br detected by the rear-side acceleration sensor 41.

The sway acceleration calculation portion 45b calculates the sway acceleration S of the center G of the vehicle body B based on the horizontal acceleration $\alpha f$ and the horizontal acceleration $\alpha r$.

The yaw control portion 45c calculates the yaw suppression force $F\omega$ based on the yaw acceleration $\omega$.

The sway control portion 45d calculates the sway low-frequency vibration suppression force FSL and the sway high-frequency vibration suppression force FSH as a sway suppression force based on the sway acceleration S.

The travel section recognition portion 45e determines whether or not the railway vehicle runs in the curve section from the running position information detected by the spot information acquiring portion 44.

The command generation portion 45f calculates control commands Ff1, Ff2, Fr1, Fr2 to be output to the actuators Af1, Af2, Ar1, Ar2 from the determination result of whether or not the railway vehicle runs in the curve section, the yaw suppression force $F\omega$, the sway low-frequency vibration suppression force FSL, and the sway high-frequency vibration suppression force FSH.

The drive portion 45g supplies corresponding electric currents to the electric motor 15, the solenoid 9e of the first shut-off valve 9, the solenoid 11e of the second shut-off valve 11, and the proportional solenoid 22c of the variable relief valve 22 based on the control commands Ff1, Ff2, Fr1, Fr2.

It should be noted that the control device C additionally comprises an A/D converter not shown for taking in signals output by the front-side acceleration sensor 40 and the rear-side acceleration sensor 41 as a hardware resource. The bandpass filters 42, 43 may also be realized by software programmed in the controller 45.

The horizontal accelerations αf and αr are set for example in such a manner that upward of FIG. 1 is positive and downward of the same is negative. The yaw acceleration calculation portion 45a calculates the yaw acceleration ω about the vehicle body center G respectively immediately above the front bogie Tf and the rear bogie Tr by dividing a difference between the horizontal acceleration αf of the vehicle front part Bf and the horizontal acceleration αr of the vehicle rear part Br by two.

The sway acceleration calculation portion 45b calculates the sway acceleration S of the center G of the vehicle body B by dividing the sum of the horizontal acceleration αf and the horizontal acceleration αr by two.

For convenience of calculating the yaw acceleration ω, installation points of the front-side acceleration sensor 40 and the rear-side acceleration sensor 41 are preferably set as follows. The front-side acceleration sensor 40 is arranged on a line along the front and aft direction or the diagonal direction passing through the center G of the vehicle body B and in the vicinity of the front side actuators Af1 and Af2. The rear-side acceleration sensor 41 is arranged in the vicinity of the rear side actuators Ar1 and Ar2 on a line passing through the center G of the vehicle body B and an installation position of the front-side acceleration sensor 40.

Since the yaw acceleration ω can be calculated by calculation from distances and positional relationships between the center G of the vehicle body B, the front-side acceleration sensor 40, and the rear-side acceleration sensor 41, and from the horizontal accelerations αf and αr, the front-side acceleration sensor 40 and the rear-side acceleration sensor 41 can be arranged at arbitrary positions. However, in that case, the yaw acceleration ω cannot be calculated by simply dividing the difference between the horizontal acceleration αf and the horizontal acceleration αr by two. There is a need for calculating the yaw acceleration ω from the difference between the horizontal acceleration αf and the horizontal acceleration αr, and the distances and the positional relationships between the center G of the vehicle body B and the acceleration sensors 40, 41.

Figure 5:
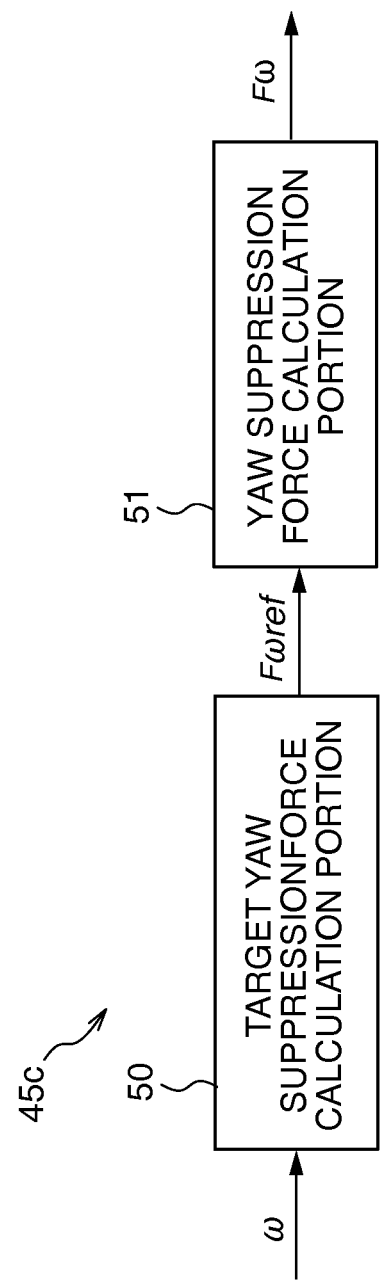
FIG. 5 is a block diagram showing a configuration of a yaw control portion of the control device.

Referring to FIG. 5, the yaw control portion 45c comprises, in order to perform the H-infinity control, a target yaw suppression force calculation portion 50 for calculating the target yaw suppression force Fωref required for suppressing yaw of the entire vehicle body B based on the yaw acceleration ω, and a yaw suppression force calculation portion 51 for calculating the yaw suppression force Fω by multiplying the target yaw suppression force Fωref obtained by the target yaw suppression force calculation portion 50 by one half.

The target yaw suppression force calculation portion 50 frequency-shapes an input of the yaw acceleration ω with a weighting function, and calculates the target yaw suppression force Fωref which is the most suitable for suppressing yaw vibration in a frequency band to be particularly suppressed among yaw vibration of the entire vehicle body. The weighting function is designed to be suitable for the railway vehicle.

The yaw suppression force calculation portion 51 calculates the yaw suppression force Fω to be output by the front side actuator Af1 and the rear side actuator Ar1 from the target yaw suppression force Fωref calculated by the target yaw suppression force calculation portion 50. The target yaw suppression force Fωref is a suppression force for suppressing the vibration in the yaw direction of the entire vehicle body B. The vehicle vibration damping device 1 suppresses the yaw of the vehicle body B by the thrust force output by the front side actuator Af1 and the rear side actuator Ar1. The yaw suppression force Fω output by the front side actuator Af1 and the rear side actuator Ar1 is calculated by the yaw suppression force calculation portion 51 dividing a value of the target yaw suppression force Fωref by two. It should be noted that the yaw is horizontal rotation of the vehicle body B, and in order to suppress the yaw, there is a need for exerting a couple for suppressing the vibration in the yaw direction of the vehicle body B by the front side actuator Af1 and the rear side actuator Ar1.

A plus or minus sign of the yaw suppression force Fω of the rear side actuator Ar1 is opposite to the yaw suppression force Fω of the front side actuator Af1. That is, when the yaw suppression force Fω of the front side actuator Af1 is X, the yaw suppression force Fω of the rear side actuator Ar1 is −X. Since the two actuators Af1 and Ar1 exert the yaw suppression force Fω, a value to be multiplied for obtaining the yaw suppression force Fω from the target yaw suppression force Fωref is one half. The value to be multiplied is changed in accordance with the number of actuators.

Therefore, for example, in a case where the front side actuators for exerting the yaw suppression force Fω are two and the rear side actuators are three, firstly, the yaw suppression force to be output by all the front side actuators is the same value as the yaw suppression force to be output by all the rear side actuators although the signs are opposite to each other. Thus, firstly, the target yaw suppression force Fωref is multiplied by one half, and further multiplied by one half since the front side actuators are two. As a result, the yaw suppression force Fω of the front side actuators is a value obtained by multiplying the target yaw suppression force Fωref by one fourth.

Meanwhile, regarding the yaw suppression force Fω of the rear side actuators, as well as the above description, the yaw suppression force to be output by all the rear side actuators is calculated by multiplying the target yaw suppression force Fωref by one half, and further required to be multiplied by one third since the number of the rear side actuators is three. As a result, the yaw suppression force is a value obtained by multiplying the target yaw suppression force Fωref by one sixth, the value of a different sign from the yaw suppression force Fω of the front side actuators.

Figure 6:
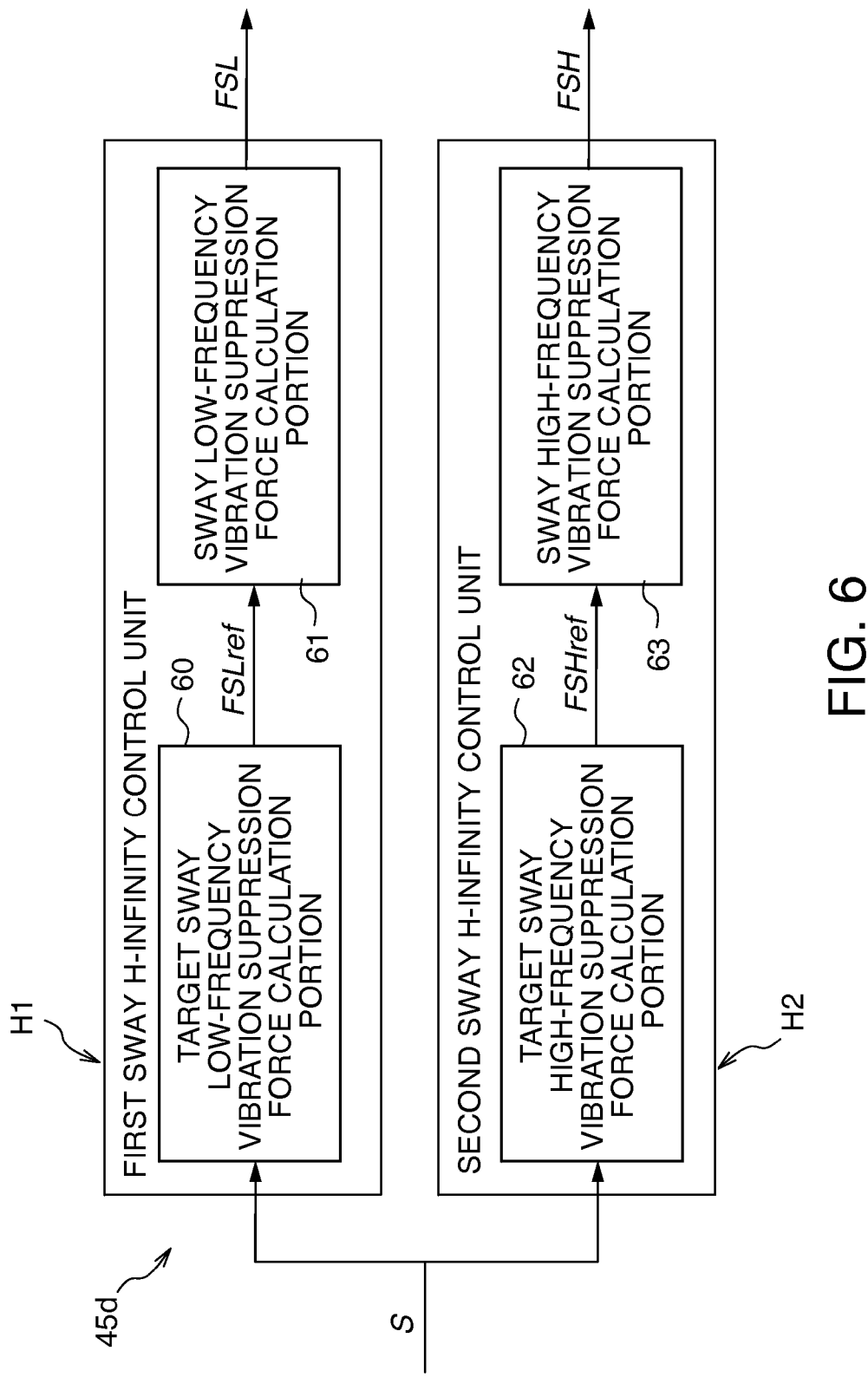
FIG. 6 is a block diagram showing a configuration of a sway control portion of the control device.

Referring to FIG. 6, the sway control portion 45d comprises a first sway H-infinity control unit H1 and a second sway H-infinity control unit H2, and calculates the sway low-frequency vibration suppression force FSL and the sway high-frequency vibration suppression force FSH as the sway suppression force.

The first sway H-infinity control unit H1 comprises a target sway low-frequency vibration suppression force calculation portion 60 for calculating the target sway low-frequency vibration suppression force FSLref required for suppressing sway low-frequency vibration of the entire vehicle body B based on the sway acceleration S, and a sway low-frequency vibration suppression force calculation portion 61 for calculating the sway low-frequency vibration suppression force FSL by multiplying the target sway low-frequency vibration suppression force FSLref calculated by the target sway low-frequency vibration suppression force calculation portion 60 by one half.

The second sway H-infinity control unit H2 comprises a target sway high-frequency vibration suppression force calculation portion 62 for calculating the target sway high-frequency vibration suppression force FSHref required for suppressing sway high-frequency vibration of the entire vehicle body B based on the sway acceleration S, and a sway high-frequency vibration suppression force calculation portion 63 for calculating the sway high-frequency vibration suppression force FSH by multiplying the target sway high-frequency vibration suppression force FSHref calculated by the target sway high-frequency vibration suppression force calculation portion 62 by one half.

When receiving an input of the sway acceleration S, the target sway low-frequency vibration suppression force calculation portion 60 frequency-shapes the sway acceleration S with a weighting function of weighting a resonance frequency band of the vehicle body B, and calculates the target sway low-frequency vibration suppression force FSLref suitable for suppressing vibration in the vehicle body resonance frequency band among the sway vibration of the entire vehicle body. The weighting function is designed to weight the resonance frequency band of the vehicle body B of the railway vehicle. In general, a resonance frequency of the vehicle body B supported on the front and rear bogies Tf and Tr by springs is about 1 Hz. Thus, setting is performed so that a component of the sway acceleration S in a frequency band from 0.5 Hz to 1.5 Hz is weighted.

The sway low-frequency vibration suppression force calculation portion 61 calculates the sway low-frequency vibration suppression force FSL to be output by the front side actuator Af2 and the rear side actuator Ar2 from the target sway low-frequency vibration suppression force FSLref obtained by the target sway low-frequency vibration suppression force calculation portion 60. The target sway low-frequency vibration suppression force FSLref is a suppression force for suppressing the low-frequency vibration in the vehicle body resonance frequency band in the sway direction of the entire vehicle body B. Since sway of the vehicle body B is suppressed by the thrust force output by the front side actuator Af2 and the rear side actuator Ar2, the sway low-frequency vibration suppression force FSL to be output by the front side actuator Af2 and the rear side actuator Ar2 is calculated by multiplying a value of the target sway low-frequency vibration suppression force FSLref by one half.

When receiving an input of the sway acceleration S, the target sway high-frequency vibration suppression force calculation portion 62 frequency-shapes the sway acceleration S with a weighting function of weighting a frequency component which is not less than a frequency of the centrifugal acceleration acting on the vehicle body B when the railway vehicle runs in the curve section, and calculates the target sway high-frequency vibration suppression force FSHref suitable for suppressing vibration of a frequency which is higher than the vehicle body resonance frequency band among the sway vibration of the entire vehicle body. The weighting function is designed to weight the frequency, which is higher than the resonance frequency band of the vehicle body B of the railway vehicle.

The frequency of the centrifugal acceleration acting on the vehicle body B by running of the railway vehicle in the curve section is substantially not more than 0.5 Hz although depending on an actual running speed of the railway vehicle or the like. Thus, for example, the weighting function is set to weight a frequency component of the sway acceleration S that is not less than 1 Hz. It should be noted that a frequency component which is not less than 2 Hz is weighted so that the target sway high-frequency vibration suppression force FSHref does not receive an influence of the centrifugal acceleration and becomes unresponsive to the centrifugal acceleration.

The sway high-frequency vibration suppression force calculation portion 63 calculates the sway high-frequency vibration suppression force FSH to be output by the front side actuator Af1 and the rear side actuator Ar1 from the target sway high-frequency vibration suppression force FSHref obtained by the target sway high-frequency vibration suppression force calculation portion 62. The target sway high-frequency vibration suppression force FSHref is a suppression force for suppressing the high-frequency vibration in the sway direction of the entire vehicle body B. In a case of this embodiment, the thrust force output by the two actuators Af1, Ar1 of the front side actuator Af1 and the rear side actuator Ar1 suppresses the sway of the vehicle body B. The sway high-frequency vibration suppression force FSH to be output by the front side actuator Af1 and the rear side actuator Ar1 is calculated by multiplying the value of the target sway high-frequency vibration suppression force FSHref by one half.

In this railway vehicle vibration damping device 1, the two actuators exert the sway low-frequency vibration suppression force FSL and the sway high-frequency vibration suppression force FSH. Thus, the value to be multiplied for obtaining the sway low-frequency vibration suppression force FSL and the sway high-frequency vibration suppression force FSH from the target sway low-frequency vibration suppression force FSLref and the target sway high-frequency vibration suppression force FSHref is one half.

This value is changed in accordance with the number of actuators. For example, a case where the front side actuators for exerting the sway low-frequency vibration suppression force FSL are three and the rear side actuators are four will be considered. In this case, firstly, since the sway low-frequency vibration suppression force to be output by all the front side actuators is the same value as the sway low-frequency vibration suppression force to be output by all the rear side actuators, the target sway low-frequency vibration suppression force FSLref is multiplied by one half, and further multiplied by one third since the front side actuators are three. As a result, the sway low-frequency vibration suppression force FSL of the front side actuators is a value obtained by multiplying the target sway low-frequency vibration suppression force FSLref by one sixth.

Meanwhile, the sway low-frequency vibration suppression force FSL of the rear side actuators is a value obtained by multiplying the target sway low-frequency vibration suppression force FSLref by one half as well as the front side actuators. The value is further multiplied by one fourth since the number of the rear side actuators is four. As a result, the sway low-frequency vibration suppression force FSL of the rear side actuators is a value obtained by multiplying the target sway low-frequency vibration suppression force FSLref by one eighth.

The travel section recognition portion 45e determines whether the section in which the railway vehicle runs is the curve section or the non-curve section based on the running position of the railway vehicle detected by the spot information acquiring portion 44, and outputs a determination result to the command generation portion 45f. Specifically, for example, the travel section recognition portion 45e comprises a map in which the travel section information is related to a current running spot, refers to the map from a current running spot of the railway vehicle, and determines whether or not the railway vehicle is running in the curve section.

Alternatively, transmitters for transmitting signals is provided in a border between the curve section and the non-curve section and before and after the curve section, and a receiver for receiving the signals of the transmitters is provided on the side of the railway vehicle as the spot information acquiring portion. In this case, the travel section recognition portion 45e determines that the railway vehicle enters the curve section upon reception of the signal of the transmitter on the side of a curve section entrance, and determines that the railway vehicle goes out to the non-curve section upon reception of the signal of the transmitter on the side of a curve section exit. To summarize, determining whether or not the railway vehicle runs in the curve section is the only function that is required to the travel section recognition portion 45e. In order to maintain favorable ride quality in the curve section, it is preferable that the control is actually switched before the railway vehicle enters the curve section for convenience of switching control in the curve section from control in the non-curve section.

Therefore, when the vehicle comes into the curve section, a spot where that fact is determined is preferably set to be in a straight section before an actual curve entrance spot. Similarly, in a case where the vehicle goes out to the non-curve section from the curve section, a spot where that fact is determined is preferably set to be in a straight section after an actual curve end spot.

As the travel section information related to the current running spot, in addition to the determination of the curve section and the non-curve section, information for setting a damping coefficient when the actuators Af2 and Ar2 function as passive dampers is preferably included. Specifically, information relating to characteristics of the curve section such as a cant amount of the curve section, a curvature, distinction of a transition curve or a steady curve, a curve pattern in a case of the transition curve, and a slack is preferably included.

The command generation portion 45f calculates control commands Ff1, Ff2, Fr1, Fr2 to be individually given to the actuators Af1 Af2, Ar1, Ar2 from a determination result of the travel section recognition portion 45e, the yaw suppression force Fω, the sway low-frequency vibration suppression force FSL, and the sway high-frequency vibration suppression force FSH.

Specifically, in a case where the travel section recognition portion 45e determines that the railway vehicle runs in the non-curve section, the command generation portion 45f generates the following control commands. That is, the control command Ff1 of letting the front side actuator Af1 output the resultant force of the yaw suppression force Fω and the sway high-frequency vibration suppression force FSH is generated. The control command Fr1 of letting the rear side actuator Ar1 output the resultant force of the yaw suppression force Fω and the sway high-frequency vibration suppression force FSH is generated. Further, the control command Ff2 of letting the front side actuator Af2 output the sway low-frequency vibration suppression force FSL, and the control command Fr2 of letting the rear side actuator Ar2 output the sway low-frequency vibration suppression force FSL are generated.

It should be noted that the yaw suppression force Fω has opposite signs for the front side actuator Af1 and the rear side actuator Ar1. Thus, for example, when a value of the yaw suppression force Fω of the front side actuator Af1 is X, the suppression force to be output by the front side actuator Af1 is X+FSH, and the suppression force to be output by the rear side actuator Ar1 is −X+FSH.

Meanwhile, in a case where the travel section recognition portion 45e determines that the railway vehicle runs in the curve section, the command generation portion 45f generates the following control commands. That is, the control command Ff1 of letting the front side actuator Af1 output the resultant force of the yaw suppression force Fω and the sway high-frequency vibration suppression force FSH is generated. The control command Fr1 of letting the rear side actuator Ar1 output the resultant force of the yaw suppression force Fω and the sway high-frequency vibration suppression force FSH is generated. Further, the control command Ff2 of letting the front side actuator Af2 function as a passive damper, and the control command Fr2 of letting the rear side actuator Ar2 function as a passive damper are generated.

The drive portion 45g lets each of the actuators Af1, Af2, Ar1, Ar2 exert the thrust force or function as a passive damper in accordance with the control commands Ff1, Ff2, Fr1, Fr2. Therefore, the drive portion 45g supplies corresponding electric currents to the electric motor 15, the solenoid 9e of the first shut-off valve 9, the solenoid 11e of the second shut-off valve 11, and the proportional solenoid 22c of the variable relief valve 22 for each of the actuators Af1, Af2, Ar1, Ar2.

In more detail, in a case where the control commands Ff2 and Fr2 are not the commands of letting the actuators Af2 and Ar2 function as passive dampers, the drive portion 45g generates electric current commands to be given to the electric motor 15, the solenoid 9e of the first shut-off valve 9, the solenoid 11e of the second shut-off valve 11, and the proportional solenoid 22c of the variable relief valve 22 for each of the actuators Af1, Af2, Ar1, Ar2 in accordance with the direction and the magnitude of the thrust force to be exerted by each of the actuators Af1, Af2, Ar1, Ar2. At this time, regarding the electric current command to be given to the proportional solenoid 22c, control precision is preferably ensured by feedback of the thrust force actually output by each of the actuators Af1, Af2, Ar1, Ar2.

In a case where the control commands Ff2 and Fr2 are the commands of letting the actuators Af2 and Ar2 respectively function as passive dampers, the drive portion 45g outputs electric current commands of making electric currents to be given to the electric motor 15, the solenoid 9e of the first shut-off valve 9, the solenoid 11e of the second shut-off valve 11, and the proportional solenoid 22c of the variable relief valve 22 zero to the actuators Af2 and Ar2. The actuators Af2 and Ar2 always discharge the working oil from the cylinder 2 in both the expansion and contraction operations. The discharged working oil is returned to the tank 7 via the discharge passage 21. The variable relief valve 22 gives resistance to this flow, thereby causing the actuators Af2 and Ar2 to function as passive dampers.

Regarding the electric motor 15, the electric current is not necessarily completely zero but the rotation speed may be decreased to such an extent that there is no harmful effect on the actuators Af2 and Ar2 functioning as passive dampers. When the railway vehicle enters the non-curve section after running through the curve section, the control commands Ff2 and Fr2 respectively become the commands of letting the actuators Af2 and Ar2 output the sway low-frequency vibration suppression force FSL calculated by the sway control portion 45d. In accordance with this, the actuators Af2 and the Ar2 are restored to be the actuators for exerting the thrust force corresponding to the sway low-frequency vibration suppression force FSL from a passive damper state.

In a case where the information such as the cant amount of the curve section and the curvature is obtained, when the actuators Af2 and Ar2 function as passive dampers, a current amount to be given to the proportional solenoid 22c of the variable relief valve 22 of the actuators Af2 and Ar2 is determined from the information, and the damping coefficient of the actuators Af2 and Ar2 is preferably set to be the most suitable for the curve section in which the railway vehicle runs. In this case, the damping coefficient is related to the curve section in advance.

Alternatively, the current amount to be given to the proportional solenoid 22c of the variable relief valve 22 is related to the curve section in advance. Thereby, the damping coefficient of the actuators Af2 and Ar2 can be optimized for each curve section of a railway line.

As described above, according to this railway vehicle vibration damping device 1, while the railway vehicle runs in the non-curve section, the actuators Af1 and Ar1 serving as a part of the front and rear side actuators output the resultant force of the yaw suppression force Fω and the sway high-frequency vibration suppression force FSH, and the remaining front and rear side actuators Af2 and Ar2 output the sway low-frequency vibration suppression force FSL. The vibration in the yaw direction and the sway direction of the vehicle body B is thereby reduced, so that the ride quality can be improved.

According to this railway vehicle vibration damping device 1, while the railway vehicle runs in the curve section, the actuators Af1 and Ar1 serving as a part of the front and rear side actuators output the resultant force of the yaw suppression force Fω and the sway high-frequency vibration suppression force FSH, and the remaining front and rear side actuators Af2 and Ar2 function as passive dampers. Therefore, the vibration in the yaw direction of the vehicle body B and the vibration in the sway direction of a high frequency which is not less than the frequency of the centrifugal acceleration at the time of running in the curve section can be effectively suppressed. Further, the damping force exerted by the passive dampers also effectively suppresses the low-frequency vibration in the sway direction without being affected by the centrifugal acceleration. Therefore, the ride quality of the railway vehicle at the time of running in the curve section can be improved.

In detail, the acceleration detected by the acceleration sensors 40 and 41 during running in the curve section includes a centrifugal acceleration component. This centrifugal acceleration component cannot be completely removed even by performing filtering processing at the time of obtaining the sway suppression force FS. Therefore, when the sway suppression force is simply calculated and the actuators Af2 and Ar2 are controlled at the time of running in the curve section, the thrust force becomes excessive.

Since a frequency band of the centrifugal acceleration is overlapped with the resonance frequency band of the vehicle body B, an attempt to remove the vibration component of the centrifugal acceleration from the accelerations detected by the acceleration sensors 40 and 41 also removes an acceleration component of the resonance frequency band of the vehicle body B. In this case, therefore, the thrust force of the actuators Af2 and Ar2 for suppressing the vibration in the resonance frequency band in the sway direction of the vehicle body B becomes short, and leads to deterioration of the ride quality.

In this railway vehicle vibration damping device 1, for the low-frequency vibration corresponding to the frequency band of the centrifugal acceleration in the sway direction and the resonance frequency band of the vehicle body B in the curve section, the actuators Af2 and Ar2 function as passive dampers, and for the sway vibration in a frequency band which is not less than the frequency of the centrifugal acceleration and the vibration in the yaw direction, the actuators Af1 and Ar1 exert the suppression force to suppress the vibration. Therefore, the vibration in the resonance frequency band of the vehicle body B in the sway direction can be sufficiently suppressed, and the vibration in the yaw direction can also be effectively suppressed. That is, even at the time of running in the curve section, favorable ride quality can be maintained. This effect is available even when the curve section is the transition curve or the steady curve section.

In the non-curve section, each of the actuators Af1, Af2, Ar1, Ar2 can exert a resultant force of the yaw suppression force Fω, the sway low-frequency vibration suppression force FSL, and the sway high-frequency vibration suppression force FSH. Even in this case, in the curve section, the actuators Af1 and Ar1 output the resultant force of the yaw suppression force Fω and the sway high-frequency vibration suppression force FSH, and the actuators Af2 and Ar2 function as passive dampers.

In the curve section, the actuators Af1 and Ar1 can function as passive dampers, and the actuators Af2 and Ar2 can output the resultant force of the yaw suppression force Fω and the sway high-frequency vibration suppression force FSH. Even in this case, in the non-curve section, it is possible that the actuators Af1 and Ar1 output the resultant force of the yaw suppression force Fω and the sway high-frequency vibration suppression force FSH while the actuators Af2 and Ar2 output the sway low-frequency vibration suppression force FSL.

However, in this railway vehicle vibration damping device 1, since the actuators Af2 and Ar2 for suppressing the low-frequency vibration in the sway direction in the non-curve section function as passive dampers in the curve section, the control is not required to be switched between the curve section and the non-curve section regarding the actuators Af1 and Ar1. By such a configuration, a rapid change of the control commands can be avoided and switching between a vibration suppression mode of the curve section and a vibration suppression mode of the non-curve section can be smoothly performed. A behavior of the vehicle body B following the switching between the vibration suppression modes can be stabilized, so that the ride quality of the railway vehicle can be furthermore improved.

In this railway vehicle vibration damping device 1, front-side vibration suppression force generation sources and rear-side vibration suppression force generation sources are constituted by the actuators Af1, Af2, Ar1, Ar2 capable of functioning as passive dampers. Since adjusting a valve opening pressure of the variable relief valve 22 can perform adjustment of the thrust force, the adjustment of the thrust force can be performed without using sensors.

In this railway vehicle vibration damping device 1, the electric motor 15 is required to rotate in one direction. Therefore, the response for switching rotation is not required, so that an inexpensive electric motor can be used. Since the control is simple, cost is advantageous, and hardware and software are secure, so that the structure is the most suitable for the railway vehicle vibration damping device 1. Further, all the actuators Af1, Af2, Ar1, Ar2 function as passive dampers at the time of failure. Thus, even in a case where any of the actuators Af1, Af2, Ar1, Ar2 is broken down, the deterioration of the ride quality of the railway vehicle can be kept to the minimum.

Figure 7:
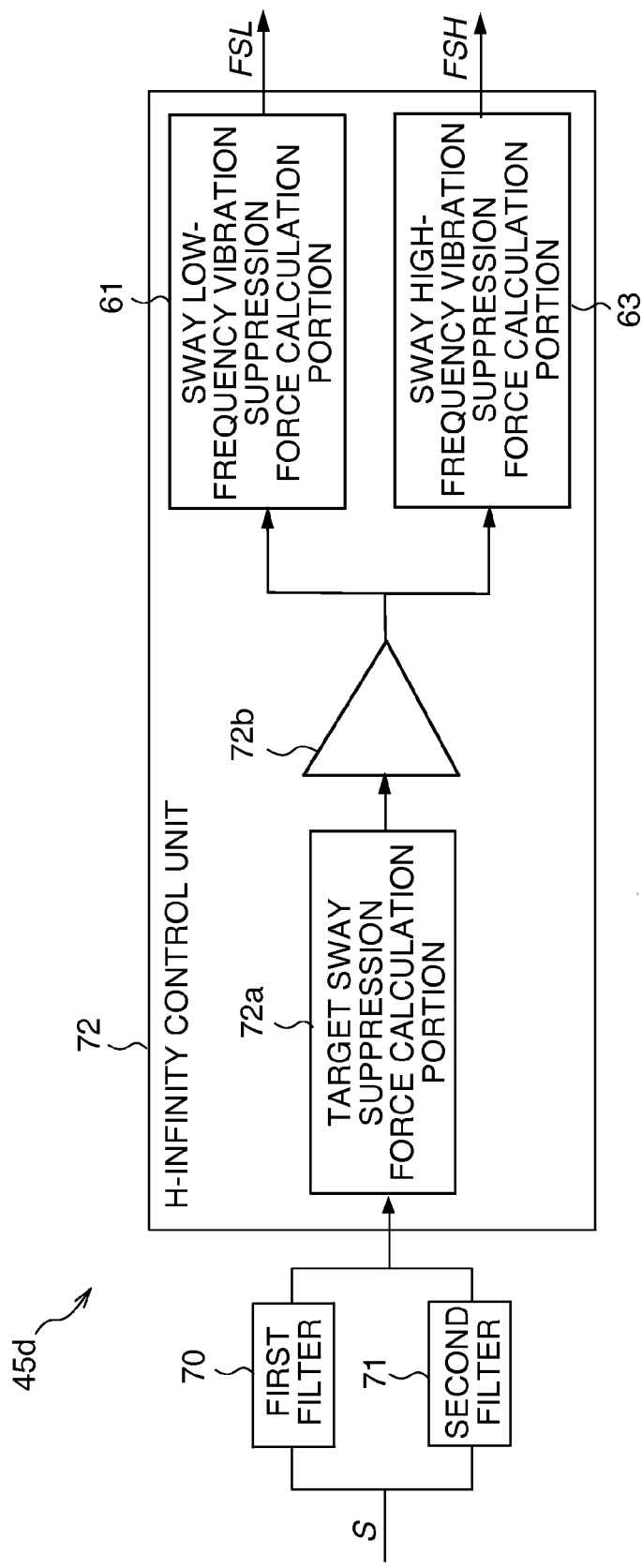
FIG. 7 is a block diagram showing another configuration of the sway control portion.

Referring to FIG. 7, another configuration of the sway control portion 45d will be described.

The sway control portion 45d may be formed as shown in FIG. 7 instead of providing the first sway H-infinity control unit H1 for suppressing the low-frequency vibration and the second sway H-infinity control unit H2 for suppressing the high-frequency vibration as shown in FIG. 6.

In this figure, the sway control portion 45d is constituted by a first filter 70 and a second filter 71 for filtering the sway acceleration S, and a H-infinity control unit 72.

The first filter 70 is a high-pass filter for extracting a frequency component that is not less than the vehicle body resonance frequency of the sway acceleration S of the vehicle body B. In general, the resonance frequency of the vehicle body B supported on the front and rear bogies Tf and Tr by the springs is about 1 Hz. Therefore, although depending on an actual resonance frequency of the vehicle body B, a cut-off frequency of the first filter 70 is set to be about 0.2 Hz for example.

The second filter 71 is a high-pass filter for extracting a frequency component which is not less than the frequency of the centrifugal acceleration acting on the vehicle body B when the railway vehicle runs in the curve section. The frequency of the centrifugal acceleration acting on the vehicle body B by the running of the railway vehicle in the curve section is substantially not more than 0.5 Hz although depending on the actual running speed of the railway vehicle or the like. Therefore, a cut-off frequency of the second filter 71 may be not less than 1 Hz. Herein, the frequency is set to be 2 Hz, such that the target sway high-frequency vibration suppression force FSHref is not affected the centrifugal acceleration and is unresponsive to the centrifugal acceleration.

The sway acceleration S filtered by the first filter 70 and the second filter 71 is respectively inputted to the H-infinity control unit 72. The H-infinity control unit 72 comprises a target sway suppression force calculation portion 72a, a gain multiplier 72b, a sway low-frequency vibration suppression force calculation portion 61, and a sway high-frequency vibration suppression force calculation portion 63.

The target sway suppression force calculation portion 72a calculates a suppression force for suppressing the low-frequency vibration in the sway direction, the suppression force being effective for suppressing the vibration in the sway direction in the vehicle body resonance frequency band from the sway acceleration S filtered by the first filter 70. A suppression force for suppressing the high-frequency vibration in the sway direction, the suppression force not affected by the centrifugal acceleration is calculated from the sway acceleration S filtered by the second filter 71.

Both the first filter 70 and the second filter 71 are high-pass filters. Thus, when the suppression force for suppressing the low-frequency vibration output by the target sway suppression force calculation portion 72a is output to the actuators Af2 and Ar2, and the suppression force for suppressing the high-frequency vibration output by the target sway suppression force calculation portion 72a is output to the actuators Af1 and Ar1, the suppression force which is twice more than the suppression force required for suppressing the vibration in the sway direction is exerted.

Thus, the gain multiplier 72b respectively multiplies the suppression force for suppressing the low-frequency vibration and the suppression force for suppressing the high-frequency vibration output by the target sway suppression force calculation portion 72a by one half. The suppression force for suppressing the low-frequency vibration multiplied by one half in such a way is set to be the target sway low-frequency vibration suppression force FSLref, and the suppression force for suppressing the high-frequency vibration multiplied by one half is set to be the target sway high-frequency vibration suppression force FSHref.

Since a phase is advanced in a frequency band that is lower than the cut-off frequencies of the first filter 70 and the second filter 71, a phase compensator may be separately provided. By constituting the first filter 70 by a low-pass filter for extracting a component that is not more than the resonance frequency band of the vehicle body B instead of the band-pass filter for extracting only the component in the resonance frequency band of the vehicle body B, overlapping with the frequency region extracted by the second filter 71 is eliminated. In this case, the gain multiplier 72b can be omitted.

The sway low-frequency vibration suppression force calculation portion 61 calculates the sway low-frequency vibration suppression force FSL from the target sway low-frequency vibration suppression force FSLref. The sway high-frequency vibration suppression force calculation portion 63 calculates the sway high-frequency vibration suppression force FSH from the target sway high-frequency vibration suppression force FSHref.

Even by this sway control portion 45d, the same vibration suppression effect as a case where the sway control portion 45d is formed by the first sway H-infinity control unit H1 and the second sway H-infinity control unit H2 can be obtained. The configuration that the sway acceleration S is filtered by the first filter 70 and the second filter 71 is the most suitable for a case where design of the H-infinity control unit and installation thereof into a processor are difficult and a case where increase in the number of the H-infinity control unit is not preferable. Even in a case where there are no such reasons, the sway control portion 45d can be constituted as shown in FIG. 7 as a matter of course.

In the railway vehicle vibration damping device 1 described above, the actuators Af1 and Af2 constitute the front-side vibration suppression force generation sources, and the actuators Ar1 and Ar2 constitute the rear-side vibration suppression force generation sources. In furthermore detail, the front side actuator Af1 corresponds to a part of the front-side vibration suppression force generation sources, and the front side actuator Af2 corresponds to all the remaining front-side vibration suppression force generation sources. The rear side actuator Ar1 corresponds to a part of the rear-side vibration suppression force generation sources, and the rear side actuator Ar2 corresponds to all the remaining rear-side vibration suppression force generation sources.

The contents of Tokugan 2012-056848, with a filing date of Mar. 14, 2012 in Japan, are hereby incorporated by reference.

Although the invention has been described above with reference to a certain embodiment, the invention is not limited to the embodiments described above. Modifications and variations of the embodiment described above will occur to those skilled in the art, within the scope of the claims.

Hereinafter, examples of modification will be described.

The railway vehicle vibration damping device 1 described above is to perform the H-infinity control. Thus, irrespective of the frequency of the vibration inputted to the vehicle body B, a high vibration suppression effect can be obtained, and a high robust property can be obtained. This does not exclude non-H-infinity control from being used as the vibration suppression control. For example, in a case where Skyhook control is to be performed, the following procedure may be taken. That is, a yaw speed and a sway speed immediately above the front bogie Tf and the rear bogie Tr of the vehicle body B are calculated from the horizontal accelerations αf and αr. The sway speed is filtered by the first filter 70 and the second filter 71, and the yaw speed is multiplied by a Skyhook damping coefficient (Skyhook gain), so that the yaw suppression force Fω is obtained. The filtered sway speed is multiplied by the Skyhook damping coefficient (Skyhook gain), so that the sway low-frequency vibration suppression force FSL and the sway high-frequency vibration suppression force FSH are calculated.

In a case where variable damping force dampers are used as the front-side vibration suppression force generation sources and the rear-side vibration suppression force generation sources, Karnopp control can be used for realizing Skyhook dampers. From the yaw speed and the sway speed immediately above the front bogie Tf and the rear bogie Tr of the vehicle body B, the stroke direction of the variable damping force dampers, and the Skyhook damping coefficient, the yaw suppression force Fω, the sway low-frequency vibration suppression force FSL, and the sway high-frequency vibration suppression force FSH can be calculated.

This invention can be implemented as long as the actuators Af2 and Ar2 function as passive dampers in the curve section. Therefore, the actuators Af1, Ar1 can be formed to be exclusive to actuators having no passive damper function. The number of actuators is not limited to the embodiments described above. As long as two or more actuators are respectively installed in the front part and in the rear part of the vehicle body B, and the number of actuators with which a part of the front side actuators and a part of the rear side actuators can respectively exert the resultant force of the yaw suppression force $F\omega$ and the sway high-frequency vibration suppression force FSH and the remaining front and rear side actuators can function as passive dampers in the curve section are installed, this invention can be implemented.

INDUSTRIAL APPLICABILITY

This invention provides a preferable effect for improving the ride quality of a railway vehicle.

The embodiments of this invention in which an exclusive property or privilege is claimed are defined as follows:

The invention claimed is:

1. A railway vehicle vibration damping device, comprising:
   two or more front-side vibration suppression force generation sources interposed between a front bogie and a vehicle body of a railway vehicle;
   two or more rear-side vibration suppression force generation sources interposed between a rear bogie and the vehicle body of the railway vehicle; and
   a programmable controller programmed to:
      calculate a yaw suppression force for suppressing vibration in a yaw direction of the vehicle body;
      calculate a sway suppression force for suppressing vibration in a sway direction of the vehicle body;
      control the front-side vibration suppression force generation sources and the rear-side vibration suppression force generation sources based on the yaw suppression force and the sway suppression force;
   wherein the controller is further programmed to:
      calculate a sway high-frequency vibration suppression force for suppressing vibration having a frequency which is not less than a frequency of a centrifugal acceleration acting on the vehicle body when the railway vehicle runs in a curve section; and
      control at least one of the front-side vibration suppression force generation sources and at least one of the rear-side vibration suppression force generation sources to output a resultant force of the yaw suppression force and the sway high-frequency vibration suppression force and control all the remaining front-side vibration suppression force generation sources and all the remaining rear-side vibration suppression force generation sources to function as passive dampers, when the railway vehicle runs in the curve section.

2. The railway vehicle vibration damping device according to claim 1, wherein the controller is further programmed to:
   calculate a sway low-frequency vibration suppression force for suppressing vibration in a resonance frequency band of the vehicle body;
   let at least a part of the front-side vibration suppression force generation sources and at least a part of the rear-side vibration suppression force generation sources output the resultant force of the yaw suppression force and the sway high-frequency vibration suppression force; and
   let all the remaining front-side vibration suppression force generation sources and all the remaining rear-side vibration suppression force generation sources output the sway low-frequency vibration suppression force, when the railway vehicle runs in a non-curve section.

3. The railway vehicle vibration damping device according to claim 2, further comprising:
   a first sway H-infinity control unit for weighting a vehicle body resonance frequency component of a sway acceleration of the vehicle body and calculating a sway-low-frequency vibration suppression force; and
   a second sway H-infinity control unit for weighting a frequency component of the sway acceleration of the vehicle body, the frequency component being not less than the frequency of the centrifugal acceleration acting on the vehicle body, and calculating the sway-high-frequency vibration suppression force.

4. The railway vehicle vibration damping device according to claim 2, further comprising:
   a first filter for extracting at least a vehicle body resonance frequency component of the sway acceleration of the vehicle body; and
   a second filter for extracting a frequency component of the sway acceleration of the vehicle body, the frequency component of the sway acceleration of the vehicle body being not less than the frequency of the centrifugal acceleration acting on the vehicle body,
   wherein the controller is further programmed to:
   calculate a sway-low-frequency vibration suppression force based on a sway acceleration filtered by the first filter; and
   calculate the sway-high-frequency vibration suppression force based on a sway acceleration filtered by the second filter.

5. The railway vehicle vibration damping device according to claim 1, further comprising:
   a spot information acquiring portion for acquiring spot information serving as running position information of the railway vehicle,
   wherein the controller is further programmed to determine whether or not the railway vehicle runs in the curve section based on the running position information of the railway vehicle.

6. The railway vehicle vibration damping device according to claim 5, wherein
   the spot information acquiring portion is constituted by a monitor for acquiring the running position information; and
   the controller is further programmed to determine whether or not a section in which the railway vehicle runs corresponds to the curve section based on the running position information.

7. The railway vehicle vibration damping device according to claim 1, wherein each of the front-side vibration suppression force generation sources and the rear-side vibration suppression force generation sources comprises:
   a cylinder filled with a fluid;
   a piston inserted into the cylinder so as to be free to slide;
   a rod inserted into the cylinder and coupled to the piston;
   a rod side chamber and a piston side chamber partitioned in the cylinder by the piston;
   a tank of the fluid;

a first shut-off valve provided in a first passage providing connection between the rod side chamber and the piston side chamber;

a second shut-off valve provided in a second passage providing connection between the piston side chamber and the tank;

a pump for supplying a liquid from the tank to the rod side chamber;

a discharge passage providing connection between the rod side chamber and the tank;

a variable relief valve provided in the discharge passage, the variable relief valve being capable of changing a relief pressure;

a suction passage for allowing only a flow of the fluid from the tank toward the piston side chamber; and a one-way passage for allowing only a flow of the fluid from the piston side chamber toward the rod side chamber.

8. The railway vehicle vibration damping device according to claim 1, further comprising:

a front-side acceleration sensor for detecting a horizontal acceleration in a vehicle transverse direction of a vehicle front part supported by the front bogie; and a rear-side acceleration sensor for detecting a horizontal acceleration in a vehicle transverse direction of a vehicle rear part supported by the rear-bogie, wherein the controller is further programmed to calculate the yaw suppression force based on the horizontal acceleration in the vehicle transverse direction of the vehicle front part and the horizontal acceleration in the vehicle transverse direction of the vehicle rear part.

9. The railway vehicle vibration damping device according to claim 1, further comprising:

a front-side acceleration sensor for detecting a horizontal acceleration in a vehicle transverse direction of a vehicle front part supported by the front bogie; and a rear-side sensor for detecting a horizontal acceleration in a vehicle transverse direction of a vehicle rear part supported by the rear bogie, wherein the controller is further programmed to calculate the sway suppression force based on the horizontal acceleration in the vehicle transverse direction of the vehicle front part and the horizontal acceleration in the vehicle transverse direction of the vehicle rear part.

* * * * *